UNITED STATES PATENT OFFICE.

PAUL JULIUS, OF LUDWIGSHAFEN, GERMANY, ASSIGNOR TO BADISCHE ANILIN & SODA FABRIK, OF LUDWIGSHAFEN, GERMANY, A CORPORATION OF BADEN.

BLACK SULFUR DYE AND PROCESS OF PRODUCING SAME.

SPECIFICATION forming part of Letters Patent No. 688,646, dated December 10, 1901.

Application filed August 13, 1901. Serial No. 71,957. (No specimens.)

*To all whom it may concern:*

Be it known that I, PAUL JULIUS, doctor of philosophy and chemist, a subject of the Emperor of Austria-Hungary, residing at Ludwigshafen-on-the-Rhine, in the Kingdom of Bavaria, Germany, have invented new and useful Improvements in Black Coloring-Matters and Processes of Producing Same, of which the following is a specification.

In the specification of Letters Patent No. 648,755 I have described the production of a black coloring-matter which can be obtained by melting dinitro-di-para-hydroxy-diphenyl-meta-phenylene-diamin with sulfur and sodium sulfid. I have now discovered that a new black coloring-matter different from that described in the specification of the Letters Patent No. 648,755 can be obtained by treating dinitro-chlor-di-para-hydroxy-diphenyl-meta-phenylene-diamin with sulfur and sodium sulfid. This new coloring-matter dyes unmordanted cotton bluer shades of black than the corresponding dyestuff obtained from dinitro-di-para-hydroxy-diphenyl-meta-phenylene-diamin, and these shades when subjected to the action of oxidizing agents—such as chromium salts, chromates, hydrogen peroxid, copper sulfate, steam containing air, and the like—become greener than do the shades produced by the dye obtained from the aforementioned unchlorinated meta-phenylene-diamin derivative.

The new chlor-dinitro-dihydroxy-diphenyl-meta-phenylene-diamin used as the initial material for the purposes of my present invention and which I have prepared for the first time can be obtained by condensing dinitro-trichlor-benzene of melting-point 103.5° centigrade (see Jungfleisch, *Jahresberichte für Chemie*, 1868, p. 351) with para-amido-phenol in the presence of an agent that will bind hydrochloric acid—for instance, sodium acetate or sodium carbonate.

The following examples will serve to further illustrate the nature of my invention and the manner in which the same may be carried into practical effect; but the invention is not confined to the examples. The parts are by weight.

*Example 1—Condensation product from one molecular proportion of 3.5 dinitro-to 1.2.4. trichlor-benzene and two molecular proportions of para-amido-phenol.*—Heat while stirring two hundred and seventy-two (272) parts of dinitro-trichlor-benzene of melting-point 103.5° centigrade, three hundred (300) parts of para-amido-phenol-hydrochlorid, six hundred (600) parts of crystallized sodium acetate, and two thousand (2,000) parts of alcohol (containing about ninety-five per cent. of $C_2H_5OH$) for about one (1) hour in a reflux apparatus at a temperature of forty degrees (40°) centigrade. Gradually raise the temperature to the boiling-point of the mixture within from about three (3) to four (4) hours, at the end of which time the reaction is as a rule at an end. When cold, the new condensation product separates out in the form of an orange crystalline powder. Drain it on the pump, wash with a little alcohol, then with hot water to remove inorganic salts, press, and dry. The new product is insoluble in water, easily soluble in warm alcohol, and soluble with difficulty in ether. It dissolves in cold dilute caustic-soda solution, the color being yellowish red, and in warm carbonate-of-soda solution, the color being of a dirty-red shade. On the addition of mineral acids to these alkaline solutions the product is precipitated therefrom in reddish-yellow flocks.

*Example 2—Coloring-matter from dinitro-chlor-di-para-hydroxy-diphenyl-meta-phenylene-diamin.*—Heat while stirring forty (40) parts of crystallized sodium sulfid, fifteen (15) parts of sulfur, and ten (10) parts of water to a temperature of one hundred and twenty degrees (120°) centigrade and introduce ten (10) parts of the condensation product, which can be obtained in the manner described in the preceding Example 1. Gradually raise the temperature of the mixture. At about one hundred and forty degrees (140°) centigrade an energetic reaction takes place. When this is over, continue to raise the temperature to from one hundred and sixty degrees (160°) to one hundred and eighty degrees (180°) centigrade, and maintain the temperature at about this point until the mass has become dry. The coloring-matter can then be used directly for dyeing.

In the following table some of the properties of the new dye obtainable according to this invention are compared with the dye obtainable from dinitro-di-para-hydroxy-diphenyl-meta-phenylene-diamin according to the specification of Letters Patent No. 648,755.

|  | Coloring-matter. | |
| --- | --- | --- |
|  | New dye. | Dye obtained according to the specification of Letters Patent No. 648,755. |
| Color of the aqueous solution to which a little caustic soda has been added. | Violet | Blue. |
| Solution in concentrated sulfuric acid. | Slightly soluble. Solution green. | Almost insoluble. The sulfuric acid becomes discolored. |
| Aqueous solution, on the addition of sodium peroxid, becomes— | Dirty-red violet | Blue, then yellow-brown. |

Now what I claim is—

1. The process of producing a black substantive dye containing sulfur by heating dinitro-chlor-di-para-hydroxy-diphenyl-meta-phenylene-diamin with sulfur and sodium sulfid, substantially as described.

2. The black substantive dye containing sulfur, such as can be obtained substantially as described, whose aqueous solution, to which caustic soda has been added, is violet, which is slightly soluble in concentrated sulfuric acid with a green color, whose aqueous solution, on the addition of sodium peroxid, becomes dirty-red violet, and which dyes cotton black shades which become somewhat greener on treatment with potassium bichromate, substantially as described.

In testimony whereof I have hereunto set my hand in the presence of two subscribing witnesses.

PAUL JULIUS.

Witnesses:
JOHN L. HEINKE,
M. SELÜMANN.